United States Patent
Reenstra et al.

[15] 3,699,305
[45] Oct. 17, 1972

[54] HEAT SEALING APPARATUS

[72] Inventors: John E. Reenstra, 10 Ronnie Road, Wayne, N.J. 07470; Martin Malone, 27 Sunrise Drive, Hawthorne, N.J. 07506

[22] Filed: April 30, 1970

[21] Appl. No.: 43,627

Related U.S. Application Data

[62] Division of Ser. No. 726,436, May 3, 1968, Pat. No. 3,617,696.

[52] U.S. Cl. ...................219/200, 53/373, 219/243
[51] Int. Cl. ..............................................H05b 1/00
[58] Field of Search.............219/200, 243, 538, 543; 156/515, 583; 93/DIG. 1; 53/39, 329, 373

[56] References Cited

UNITED STATES PATENTS 3,170,275   2/1965   Rohdin et al. ...............53/373
3,060,652   10/1962  Eckman......................53/39 X
2,825,194   3/1958   Page.......................93/DIG. 1

Primary Examiner—C. L. Albritton
Attorney—Milton Robert Kestenbaum

[57] ABSTRACT

A heat sealing tray is comprised of a thin sheet of heater element material bonded to an insulating substrate and a rigid backing member. The sheet is etched out in a pattern defining a heating current path. An automatic temperature limiting control circuit is connected to the sheet. The circuit operates in full wave configuration and controls the partial cycle conduction of current through the heating path. A temperature sensor signals the circuit to remove the current through the path when a predetermined temperature is reached.

8 Claims, 7 Drawing Figures

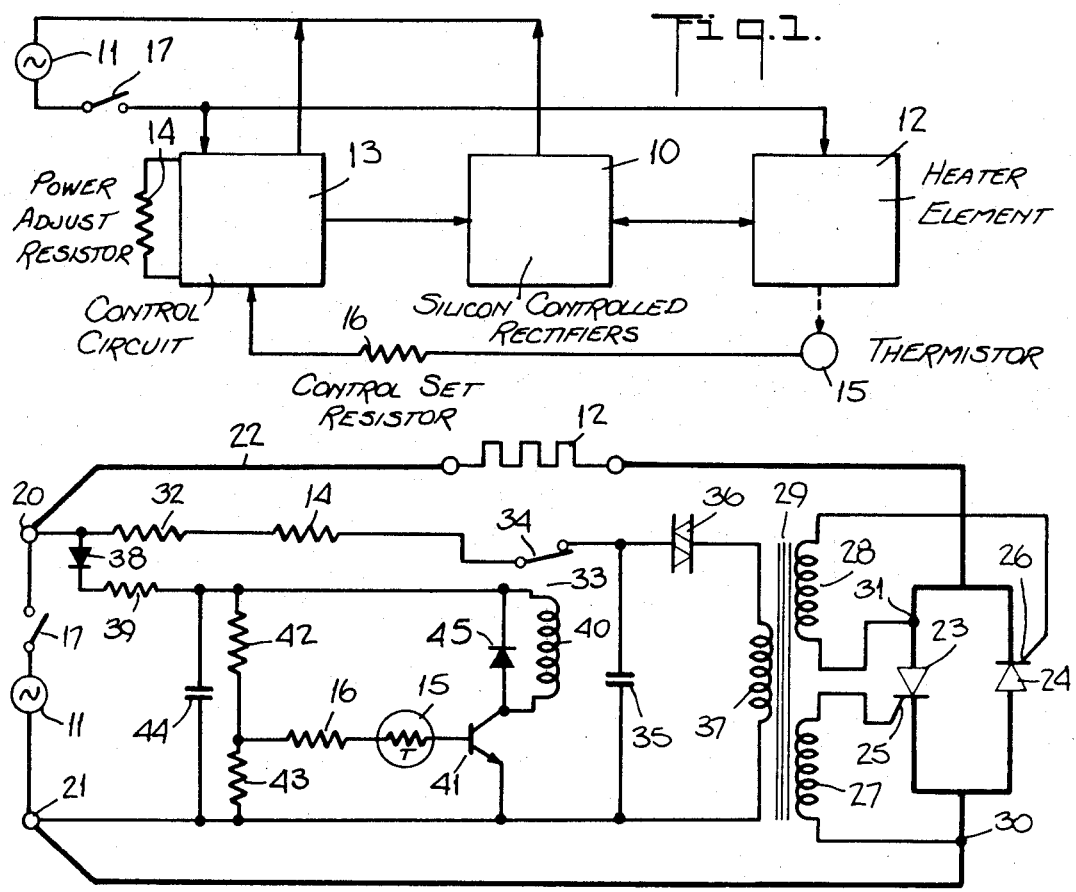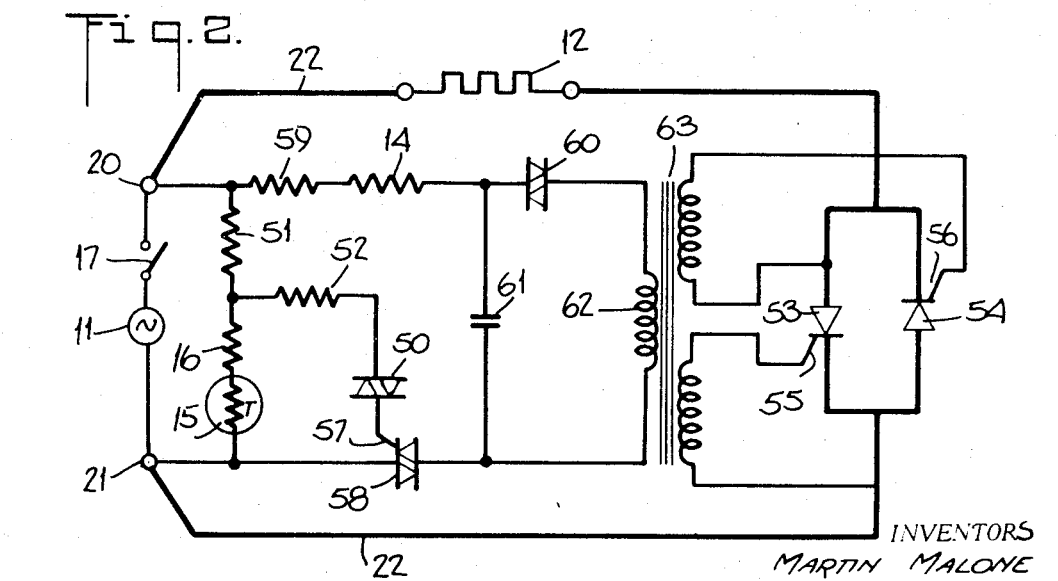

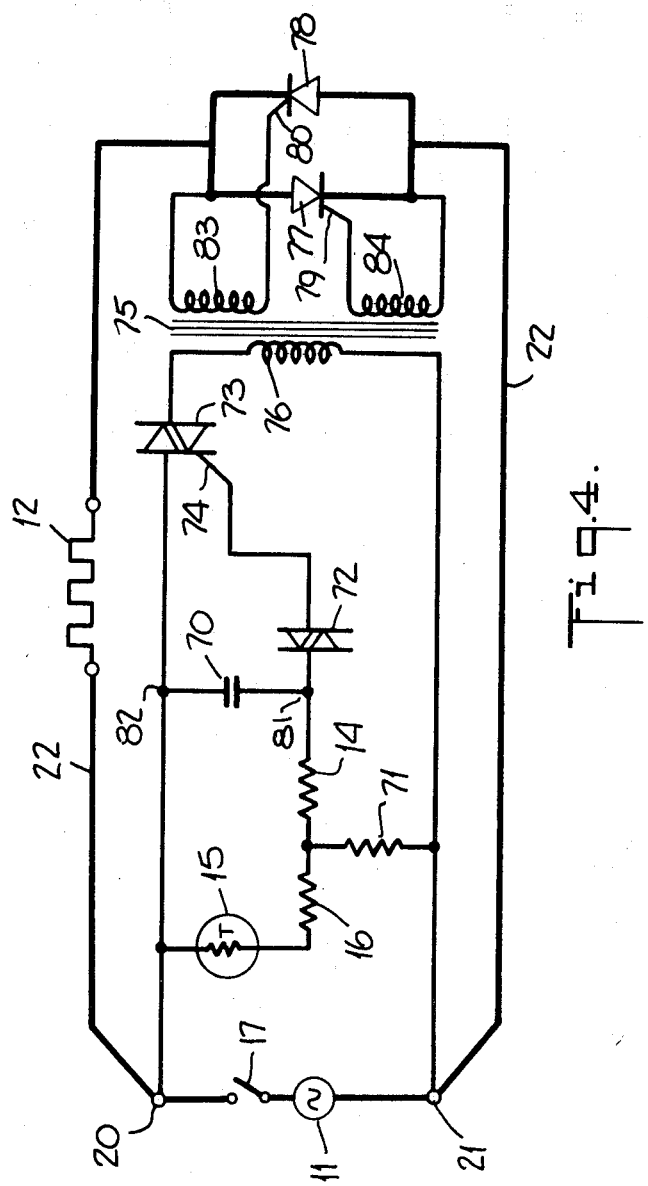

INVENTORS
MARTIN MALONE
JOHN E. REENSTRA
BY M. R. Kesten
ATTORNEY

HEAT SEALING APPARATUS

This is a division of application Ser. No. 726,436, filed May 3, 1968, now U.S. Pat. No. 3,617,696.

This invention relates to heat sealing apparatus and more particularly to the design and arrangement of heater elements and to means for controlling the operating temperature of heater elements.

Heat sealable materials, such as plastic and plasticized materials, when used in packaging may be sealed serially into pouch-type containers or as separate pre-formed containers which are sealed individually or in groups. It should be understood that the principles and teachings of the present invention are applicable to heater elements used with any form or method of heat sealing, notwithstanding that the embodiment shown relates to heater elements used for sealing lids onto separate pre-formed containers called blisters.

In blister packaging, pre-formed plastic containers are placed open side upwards in individual openings called pockets adapted to receive and hold one or more of them in position for sealing with their edges extending beyond the opening. The intended contents are placed in each blister and a lid is placed over each and sealed to a peripheral flange on the blister through a combination of heat and pressure. One type of heater element takes the form of Nichrome or stainless steel bands or wires which are arranged in the shape of the planar outline of the blister at its peripheral flange. Blisters of different sizes and configurations require different lengths of heater element to affect a seal about them. The power required to bring these heater elements to operating sealing temperature increases as the total length of heater element increases. The problem then is to seal blisters of different sizes and configurations in the same heat sealing machine. One method is to adjust the power setting of the machine for different blisters. This requires that the machine be adjusted each time a blister requiring a different sized heater element is to be sealed and as a practical matter precludes sealing different blisters at a mechanized rate.

Another method is to have a number of voltage probes serially arranged in the heat sealing machine in voltage descending steps and a contact button associated with the heater elements which is pre-positioned to make contact with the probe supplying the voltage most appropriate for the power requirements of that heater element. This arrangement is conductive to arcing between the probes and the contact button.

In both of these methods there is a marked tendency for the heater elements to overheat and burn out the sheet of non-stick material placed over them requiring frequent replacement.

Present heater elements are made up of strips or die-cut forms. In the usual case, a number of blisters are sealed at the same time. Each is positioned in a separate opening on a rigid member known as a heat sealing tray. Each opening is surrounded by its own heater element having a layer of non-stick material thereon. The strips or die-cut forms are connected together by welding or brazing wires to each heater element piece and soldering these wires to each other. The number of openings per tray is determined by the size of the package to be sealed.

The present method of construction is excessively time consuming and costly and is inherently unreliable due to the many welded and soldered connections. The welded wires, which pass through access holes in the tray beneath the heater element are detrimental in two ways: First, they tend to restrain the heater element from expanding when hot and thereby cause undue stress which fatigues the element and causes breakage of the heater element or the welded connection; secondly, the wire drains heat from the element causing a higher than required operating temperature in order to effect a seal in the area where the weld is made.

An object of this invention is to provide an apparatus for limiting the operating temperature of heater elements used in heat sealing applications.

Accordingly, a further object of this invention is to provide an apparatus for automatically selecting and controlling the power delivered to heat sealing heater elements.

Another object of this invention is to provide means for protecting non-stick material positioned over heater elements from burning out.

Yet another object of this invention is to provide means for sealing lids to pre-formed containers of different sizes, materials, configurations or different combinations of these characteristics, without changing the power setting of the heat sealing machine.

A further object of this invention is to greatly enhance the ease and economy of manufacture of heat sealing trays.

An additional object of this invention is to provide heater elements on heat sealing trays without welded or soldered connections to the heater elements.

Another object of this invention is to eliminate heat drains from heater elements.

Still another object of this invention is to provide a novel heat sealing tray in which the heater elements are etched from a foil of heater material.

These objects are accomplished in the present invention by an electronic circuit arrangement, including silicon controlled rectifiers used in full wave configurations with partial cycle conduction to maintain a constant root mean square current which is pre-set by resistor selection to yield the required power for each heater element. For the same packaging material, the power required is based on the length of the heater element. The temperature of the heater is sensed by a thermistor located in close proximity to the heater element. The thermistor output is applied to a solid state control circuit which when the desired operating temperature is achieved removes the control signal from the silicon controlled rectifiers, removing the flow of current to the heater element.

Advantageously, the temperature control circuit limites the temperature of heater elements formed by etching the desired heating current path in a foil of heater material. The foil is positioned on a substrate which is affixed to the rigid tray.

These and other objects and features will be fully understood from the following detailed description taken together with the annexed drawings in which:

FIG. 1 is a system diagram of the electronic circuit.

FIG. 2 is a detailed circuit diagram of one form of the electronic circuit employing transistor and relay means for controlling the silicon controlled rectifiers.

FIG. 3 is a detailed circuit diagram of a form of the electronic circuit employing diac and triac means for controlling the silicon controlled rectifiers.

FIG. 4 is a detailed circuit diagram of another form of the electronic circuit employing diac and triac means for controlling the silicon controlled rectifiers.

Figure 6:
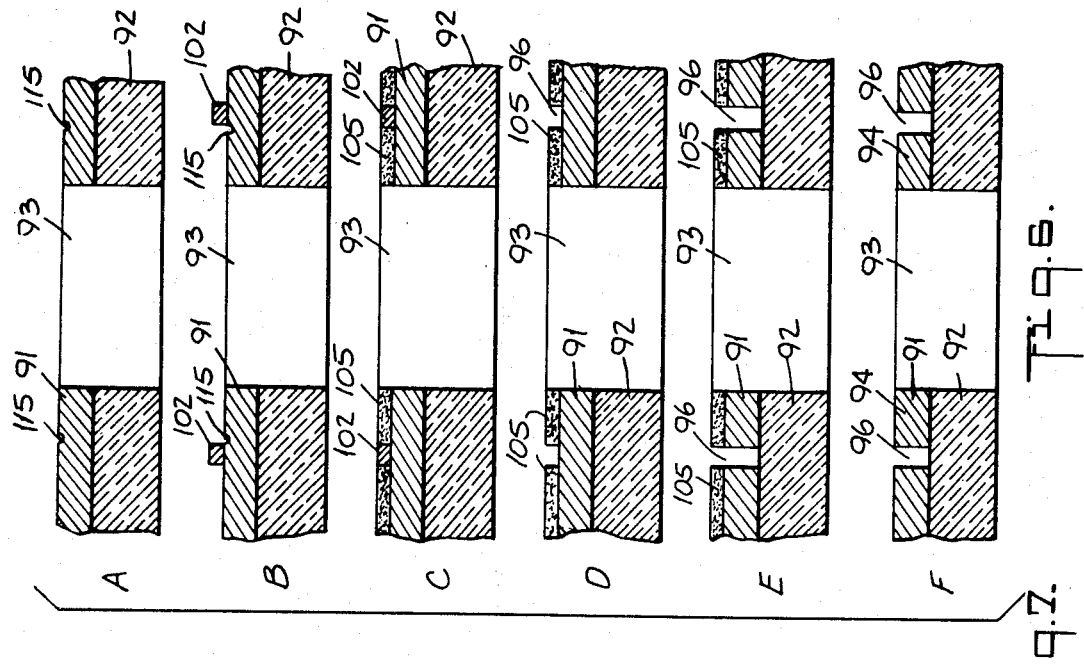
Figures 5, 7:
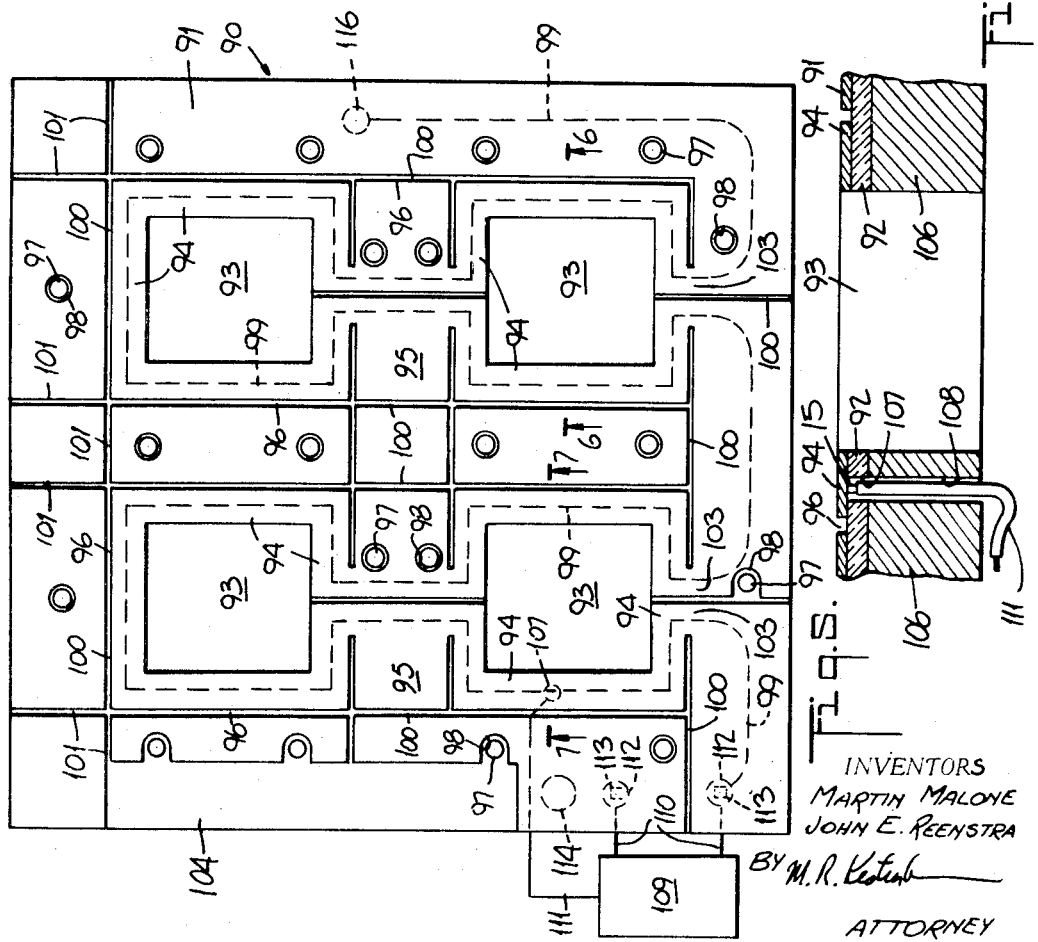
FIG. 5 is a plan view of an etched heater tray.

FIG. 6, A–F is a partial sectional view through section lines 6—6 in FIG. 5 at successive stages in its fabrication.

FIG. 7 is a sectional view through section lines 7—7 in FIG. 5 showing the position of the thermistor probe.

The system diagram of the electronic circuit arrangement for controlling the power and limiting the operating temperature to heat sealing heater elements is shown in FIG. 1. A silicon controlled rectifier circuit 10 is connected between an AC power source 11 and a heater element 12. A control circuit 13 also operates off the power source 11 and is connected to provide a control signal to the silicon controlled rectifier circuit 10. The control circuit 13 has a power adjust resistor 14 therein for controlling the firing angle of the silicon controlled rectifiers so as to control the power to the heater element 12. A thermistor 15 is positioned close to the heater element 12 and is connected in the control circuit 13 through a control set resistor 16.

CIRCUIT OPERATION

When power is applied from the AC power source 11 upon closure of switch 17, and the heater element 12 is below operating temperature, the thermistor 15 is at a high resistance, delivering no signal to control circuit 13. A control signal is then allowed to pass to the silicon controlled rectifier circuit 10 which applies power to the heater element 12. This power causes the temperature of the heater element 12 to rise which causes the temperature of the thermistor 15 to rise. When operating temperature is reached, the thermistor 15 becomes a low resistance, and delivers a signal to the control circuit 13 which abruptly removes the control signal from the silicon controlled rectifier circuit 10. Lack of control signal to the silicon controlled rectifier circuit 10 causes it to block the flow of current to the heating element 12 from the AC power source 11 causing no further rise in temperature. Thereafter the temperature of the heater element 12 will decrease until the resistance of the thermistor drops to a point where the control circuit 13 will restore a control signal to the silicon controlled rectifier circuit 10. Adjustment of the power is achieved by selection of resistor 14 based on the length of the heater element 12.

Control set resistor 16 is used to adjust the correct operating temperature of the heater element 12. Its primary function is to provide compensation for normal variation in the characteristics of the resistance of thermistor 15 and thermodynamic properties of the heater element 12 and its environment.

The power and temperature control circuit may be arranged in either of two ways:

1. Installation on a moveable tray which contains the opening or other means for positioning the blister and the heater element which is adapted to surround the blister. The control circuit 13, silicon controlled rectifier circuit 10, thermistor 15 and control set resistor 16 may be attached to the tray requiring only the application of AC voltage to the tray for operation.

2. Installation in heat sealing machine. The control circuit 13 and silicon controlled rectifier circuit 10 may be mounted in the heat sealing machine for use with many trays.

Power adjust resistor 14, thermistor 15 and control set resistor 16 are mounted to each tray, which requires six electrical connectors between the tray and machine:
 2 for resistor 14
 2 for thermistor 15 and resistor 16, and
 2 for heater element 12

Tables I and II show the proper resistance of the power adjust resistor 14 for a heater element 12 formed of one-fourth-inch wide by 0.005 inch thick stainless steel band in the temperature control circuit shown in FIG. 2. Variation of either width or thickness will require different resistor values as do the circuits shown in FIGS. 3 and 4. Table I applies to a single heater element or a number of heater elements connected in series to seal a number of blisters simultaneously. Table II applies to an even number of heater elements for sealing an even number of blisters simultaneously. The heater elements are divided into two equal sets of serially arranged heater elements which sets are connected in parallel, e.g. for six heater elements, within each of two sets of three, heater elements are connected in series and the sets are connected together in parallel.

TABLE I

HEATER ELEMENTS IN SERIES

| Heater Length—Inches | Resistance of Power Adjust Resistor |
| --- | --- |
| 25 to 35 | 10,000 ohms |
| 35 to 45 | 8,200 |
| 45 to 55 | 2,700 |
| 55 to 65 | 1,000 |
| 65 to 75 | 200 |

TABLE II

HEATER ELEMENTS IN SERIES PARALLEL

| Heater Length-Inches | Resistance of Power Adjust Resistor |
| --- | --- |
| 50 to 70 | 10,000 ohms |
| 70 to 90 | 8,200 |
| 90 to 110 | 2,700 |
| 110 to 130 | 1,000 |
| 130 to 150 | 200 |

The details of the electronic circuit for achieving the system functions described above will now be described with reference to FIG. 2.

A power source 11 of a fixed voltage of 50 volts RMS 60 cycles per second has terminals 20, 21 controlled by an on-off switch 17. A conducting line 22 of 12 gauge wire attached to the tray connects the heater element 12 to these terminals through a pair of silicon controlled rectifiers 23, 24 arranged in shunt opposed relationship. The power source 11 and its terminals 20, 21 are located in the heat sealing machine. The heater element 12 is located on a moveable tray which passes between a blister loading position and a sealing position beneath the pressure head of the heat sealing machine. The blister is placed in an opening in the tray to position it open side upwards to receive the contents to be sealed within the blister. The blister has a planar flange which extends beyond the opening to rest upon the protective layer over the heater element.

Each tray may contain an opening for receiving one blister or a number or openings for several blisters with the heater elements surrounding each opening arranged in series or in series parallel as above described.

At each tray opening, means such as depressible pins hold the sealable cards in place over the blister planar flanges.

The blisters, the container contents and the sealable cards are loaded onto the tray at a loading position which is accessible to the operators and away from the pressure head of the heat sealing machine. After the tray is loaded, it is passed beneath the pressure head of the heat sealing machine. When the tray is moved to the heat sealing position, the pressure head becomes actuated to apply pressure to squeeze the cards and the blister flanges against each other. Then in a successive stage of the heat sealing cycle, the heater elements are energized to bring them to heat sealing temperature, after which the thermal energy is removed, the pressure is released and the tray is moved out of the heat sealing position so that the sealed blister containers can be removed and the trays reloaded.

The terminals 20, 21 are arranged in the sealing machine to make contact through suitable connectors in the tray to lines 22 when the sealing cycle commences. This contact may be made by the use of probes in the sealing machine and aligned buttons in the tray which come in contact upon actuation of the pressure head in the heat sealing machine. The silicon controlled rectifiers 23, 24 have gates 25, 26 which are connected through secondary windings 27, 28 of a transformer 29 to the cathode side 30, 31 of their respective silicon controlled rectifiers.

Also electrically connected between the terminals 20, 21 is the pulse forming circuit comprising series connected resistor 32 and power adjust resistor 14, a contact 34 of a relay 33, a capacitor 35, a diac 36 and the primary winding 37 of transformer 29.

A third circuit, which has for its purpose to interrupt the flow of current through the pulse forming circuit, is also electrically connected between the terminals 20, 21. This circuit includes the series arrangement of rectifier 38, resistor 39, coil 40 of the relay 33 and transistor 41. Thermistor 15 is connected between the base of transistor 41 and to the voltage divider arrangement of resistors 42, 43 through the control set resistor 16. This arrangement is shunted by bias filter capacitor 44.

Diode 45 is connected across the coil 40 at the collector of transistor 41 to suppress the relay arc to protect the transistor.

OPERATION

When 50 volts RMS is applied through terminals 20, 21 capacitor 35 is charged through resistor 32 and power adjust resistor 14 in series with contact 34 of relay 33. For the half cycle when terminal 20 is positive with respect to terminal 21, capacitor 35 is charged such that its relay contact side is positive, and the time charge is regulated by the product of its value and the sum of resistor 32 and power adjust resistor 14. Resistor 32 is a current limiting resistor to protect the diac 36. Capacitor 35 will charge until the voltage across it is sufficient to break down the diac 36, which is a device that exhibits a negative resistance characteristic, i.e. once breakdown voltage is achieved, regardless of polarity, its resistance to flow of current is sharply reduced. The voltage at which this occurs is between 28 and 32 volts. When breakdown of diac 36 occurs, capacitor 35 discharges abruptly through diac 36 causing an impulse of current to flow in the primary winding 37 of transformer 29. The secondary windings 27, 28 of transformer 29 are connected such that a positive impulse of voltage appears at the gate 25 of silicon controlled rectifier 23. During this half cycle, the anode of silicon controlled rectifier 23 is positive and a positive gate voltage will cause it to conduct allowing current to flow through the heater element 12 causing its temperature to rise. The portion of this half cycle for which current will flow is determined by the values of resistor 32, power adjust resistor 14 and capacitor 35. Thus silicon controlled rectifier 23 conducts for a pre-selected portion of each half cycle when terminal 20 is positive.

During the alternate half cycles when terminal 21 is positive, capacitor 35 charges in the opposite polarity and the circuit operates in a like manner except that a positive impulse of voltage will be applied to the gate 26 of silicon controlled rectifier 24 causing it to conduct and to allow current to flow through the heater element 12.

Again, the portion of this half cycle for which conduction occurs is controlled by the values of resistor 32, power adjust resistor 14 and capacitor 35 and is the same pre-selected portion as when silicon controlled rectifier 23 is conducting.

In both conditions the conduction portion of the cycle is established in accordance with the length of the heater element 12 and is selected to provide an RMS or heating value of current which is a constant, i.e. the same for all heater elements regardless of their length, yielding a constant power per unit length of heater element. Selection is made by selection of the power adjust resistor 14, for example, as detailed in tables I and II for the example of a specific type and size of heater element.

The alternating current applied to terminals 20, 21 is also rectified by diode 38 and the resulting half wave rectified DC voltage is smoothed by the filter network consisting of resistor 39 and capacitor 44 and applied to the collector of switching transistor 41 in series with the coil 40 of relay 33. Resistor 39 is also a current limiting resistor to protect the diode 38. DC current is also applied through the voltage divider network of resistors 42, 43 and the series combination of the control set resistor 16 and the thermistor 15 to the base of transistor 41. When power is first applied, the thermistor 15 is at room temperature and its resistance is very high which allows insufficient current to flow into the base of the transistor 41 to allow it to conduct. The thermistor 15 is in close proximity to the heater element and its temperature will increase as the temperature of the heater element increases. As the thermistor 15 increases in temperature its resistance decreases allowing current to flow into the base of the transistor 41. When a temperature is reached where base current is sufficient to cause the transistor 41 to conduct, it switches abruptly to the conduction state causing current to flow through the coil 40 of relay 33 causing its contact 34 to open. Opening of contact 34 prevents current flow to capacitor 35 which will then no longer supply impulses to the gates 25, 26 of the silicon controlled rectifiers 23, 24 and no further current will flow through the heater element 12 and its temperature will no longer rise.

Control set resistor 16 in series with the thermistor 15 is used to adjust the temperature at which the transistor 41 will switch. This allows for compensation for variations in characteristics between different transistors 41. If a particular transistor has a low operating point, a larger resistance 16 is selected to permit less current to flow through the transistor. Selection of this resistor need only be made once upon the initial installation of the temperature control unit in the tray. Once selected it requires no further adjustment. Its value will most often fall within the range of 5,000 to 15,000 ohms.

When the current flow to capacitor 35 is prevented, the heater element 12 will begin to cool and the thermistor 15 will increase in resistance until transistor 41 will cut off and relay 33 will drop out, closing its contact 34. At this point, the circuit will operate to reheat the heater element 12. During a normal heat sealing cycle, power is applied to the terminals 20, 21 for only a few seconds after heater shut-off while the tray is under pressure. The cool-down time of the thermistor 15 is about 15 seconds and therefore only one heater shut-off operation as above described occurs during each heat sealing cycle.

Arcing, which has been experienced with probe and contact button arrangements in prior art trays, is eliminated by virtue of the action of the silicon controlled rectifiers and the control circuit. Arcing will only occur when current is flowing through the circuit.

The silicon controlled rectifiers will block the passage of current through the heater element circuit for the portion of the initial cycle of current during which the impulse forming portion of the control circuit is charging up. This may be 10 electrical degrees or more depending upon the predetermined portion of the half cycle for which conduction is established. Therefore current will not flow upon closure of the probe and contact button. As above described, current through the heater element circuit is shut off before the heat sealing cycle is concluded. Hence the silicon controlled rectifiers will again be blocking the flow of current before the probes and contact buttons are separated.

FIG. 3 shows another embodiment of the temperature control circuit in accordance with my invention in which a combination of a diac 50 and a triac 58 replace the combination of the transistor 41 and the relay 33 of the embodiment shown in FIG. 2, for cutting off the flow of current to the pulse forming capacitor 61.

The circuit which includes the heater element and silicon controlled rectifiers contains the same arrangement of elements as the circuit in FIG. 2. The pulse forming circuit connected between terminals 20, 21 comprises series connected resistor 59 and power adjust resistor 14, a capacitor 61, a diac 60, the primary winding 62 of a transformer 63 and a triac 58.

A third circuit electrically connected between the terminals 20, 21 which has for its purpose the interruption of the flow of current through the pulse forming circuit, includes the series arrangement of resistors 51 and 52, diac 50, and the gate 57 of the triac 58. Thermistor 15 is connected between the terminal 21 and the junction of resistors 51 and 52 through the control set resistor 16.

OPERATION

The operation of the circuit in FIG. 3 is similar to that of FIG. 2 except that the relay portion has been replaced by a triac solid state switching device. The impulse forming circuit consisting of resistor 59, power adjust resistor 14, capacitor 61, diac 60 and transformer 63 perform exactly the same function as the similar elements shown in FIG. 1. When power is applied to terminals 20, 21 current flows through resistor 51 and 52, through diac 50 and into the gate 57 of triac 58. Triac 58 will conduct causing current to flow through to capacitor 61 to form impulses to be applied alternately to the gates 55, 56 of silicon controlled rectifiers 53 and 54 respectively. At room temperature, thermistor 15 is at a high resistance as the heater element 12 heats up. As the resistance of thermistor 15 decreases, the voltage at the junction of resistors 16, 51 and 52 will decrease. When a temperature is reached such that the voltage at that junction is less than the diac 50 breakdown voltage, current will no longer flow into the gate 57 of the triac 58. The triac 58 will no longer conduct, preventing current from flowing through to capacitor 61 and impulses will no longer be supplied to the silicon controlled rectifiers 53, 54.

Again, control set resistor 16 is adjusted to select the desired temperature at which the power is shut off to the heater element 12.

FIG. 4 shows a second embodiment of the temperature control circuit according to my invention using a combination of a diac and a triac.

The circuit which includes the heater element 12 and the silicon controlled rectifiers 77, 78 contains the same arrangement of elements as the circuits in FIG. 2.

Connected between the power terminals 20, 21 are a triac 73 and the primary winding 76 of a saturable transformer 75. Thermistor 15 is part of a voltage divider arrangement which includes control set resistor 16 and resistor 71 connected in series with it across the power terminals 20, 21.

A capacitor 70 is connected through the power adjust resistor 14 to a junction of the voltage divider arrangement. A diac 72 connects one side of the capacitor 70 to the gate 74 of the triac 73.

OPERATION

With 50 volts RMS applied to terminals 20, 21 circuit operation is as follows: During each half cycle when terminal 20 is positive with respect to terminal 21 current will flow through the phase shift network of resistor 71, power adjust resistor 14 and capacitor 70, causing capacitor 70 to charge such that its terminal 82 is positive with respect to terminal 81. When the voltage across capacitor 70 is sufficient to exceed the breakdown voltage of diac 72 capacitor 70 will discharge through diac 72 into the gate terminal 74 of triac 73 causing the triac 73 to conduct and allowing current to flow through the primary winding 76 of transformer 75. Transformer 75 is a pulse transformer and as such will saturate easily. When saturation occurs, output voltage will become nil. Since conduction of triac 73 occurs at some point after the half cycle has commenced, the wave form has an abrupt rise. The pulse transformer secondary windings 83, 84 will rise in voltage abruptly at the same time until saturation occurs and then will fall abruptly. The secondary voltage will therefore be a pulse of voltage occurring at the point in the half cycle at which the triac 73 begins to conduct. The output pulse of secondary winding 84 applied to the gate 79 of silicon controlled rectifier 77 will cause it to conduct from this point in the half cycle until the end of the half cycle.

During alternate half cycles, capacitor 70 charges in the reverse polarity until breakdown voltage of diac 72 is reached, at which time triac 73 will conduct in the opposite direction. This will cause reverse polarity pulses to occur at the transformer secondary windings. The output pulses of secondary winding 83 applied to the gate 80 of silicon controlled rectifier 78 will cause it to conduct for the partial half cycle.

When the heater element 12 is cold, thermistor 15 which senses heater temperature is at a high value of resistance and very little current will flow through it. As the heater warms up, the thermistor decreases in resistance and begins to shunt current from the resistor 14 — capacitor 70 path. When operating temperature is reached, the resistance of the thermistor 15 is low enough to prevent the capacitor 70 from charging to the breakdown voltage of the diac 72 and triac 73 is prevented from conducting, thereby removing pulses from the silicon controlled rectifiers and no increase in heater temperature will occur.

Referring to FIGS. 5 and 6, the etched heater 90 is made from a laminated construction of a metal foil 91 bonded to a high temperature composition insulating substrate 92. The binding medium is a flexible temperature resistant cement. The metal foil 91 is chemically etched through to provide a continuous electrical circuit with a heater element strip 94 surrounding each blister locating opening 93. The strip 94 has a sufficiently reduced width to operate at the proper sealing temperature when electric current is applied. The metal areas 95 between blister openings are much wider and thereby does not appreciably rise in temperature. The following metals are some of many that might be used for the heater foil.

| Copper | Nichrome | Kovar |
| Nickel | Nickel-silver | Inconel |
| Chromium | Copper Nickel | Carbon Steel |
| Stainless steel | Invar | |

The choice of metals is optional and is determined by the length and width of the heater element. The thickness is also a matter of convenience. However, the optimum range for etching processes is between 0.004 inch and 0.010 inch thick. Some suitable insulating substrates are: Asbestos-filled phenolic; silicon rubber and glass-filled melemine. These may be rigid or flexible and up to one-fourth-inch thick. The bonding cements may be one of a number of known products of laminate manufacturers. These are mostly silicon-base types.

Present trays have a sheet of non-stick material, such as teflon-coated fiberglass, cemented over the working surface to prevent the plastic blisters from sticking to the heater elements. The thickness of this sheet and the cement cause a temperature loss which requires a higher than otherwise necessary heater temperature for a good seal. The etched heater tray 90 has a sprayed-on and cured in place non-stick coating of a teflon or silicon-base material, the thickness of which is 0.001 inch. This allows a substantially lower operating temperature which enhances heater life.

In FIG. 5, for ease of illustration, four blister openings 93 of rectangular shape are shown. Solid lines 96 are etched through to yield the heater strip 94 around each blister opening 93. Pins 97 are fixed on the tray to locate the cards upon the blisters. An area 98 around each pin 97 is etched through to prevent possible short circuits in case a metal platen is used in the heat sealing machine to apply pressure during the sealing operation. Broken line 99 shows the path of electric heating current through each heater element and between heater elements. Etched lines 100 are required to block the current flow from unwanted paths that would by-pass the heater areas. Other etched lines 101 have no relationship to the heater or electric current flow. However, by inspection it is obvious their presence simplifies the layout process. It is advisable to make a sketch of the layout before proceeding to ensure proper flow of current.

One way to construct the heater elements is to first cut out blister openings 93 in the laminate in exact locations to those on tray. Then lines 115 are scribed around each opening 93 the required width of the heater element, usually one-fourth-inch — (FIG. 6A) and ⅛-inch masking tape 102 laid along the scribe lines 115 (FIG. 6B). Lines 100 required for proper electrical flow are added.

Most trays have blister openings 93 positioned in lines. Therefore, as can be seen in FIG. 5, ⅛-inch masking tape strips 102 can be positioned across the entire tray at the required distance from each opening 93 along each side of the blister opening 93. Then by cutting away small sections of the tape 102 a usable circuit will result. Lines 101 can be left in place or removed. Then lines 100 that run between opening centers can be added. The width at 103 is equal to the width of the heating strips around the openings.

In order to make the tray usable in multiprobe type machines, masking tape is applied in the area 104 where all but the 50 volt probe contacts the tray. The 50 volt probe will contact the tray along one peripheral edge at 114 and the return probe will contact along the opposite peripheral edge at 116.

After the masking is complete, a coating of etch resistant material 105 is applied (FIG. 6C). When the etch resist 105 is dry all masking tape is removed (FIG. 6D) and the laminate is etched with a commercially available etchant such as Hunt Chemical Corporation RCE solution following the recommendations published by the manufacturer, Etching techniques are standard and need not be described here since they are all suitable because of the lack of close tolerance etching requirements for this application. After etching is complete, as indicated by visually noting the complete removal of metal in the desired areas, (FIG. 6E) the etch resist is removed per manufacturer's instructions (FIG. 6F). The finished circuit is then rinsed in clear agitated water to remove traces of etchant and baked at 150° F. for 2 hours to drive off all moisture. After drying, the heater elements are allowed to cool and are sprayed with a non-stick coating such as Dupont Teflon-s, then dried at 100° F. for two hours and baked at 350° F. for one-half-hour to cure the coating.

Referring to FIG. 7, the rigid tray 106 is shown with the laminate comprising the substrate 92 and the etched heater foil 91 thereon. A hole 107 is drilled in the substrate 92 behind one of the heater strips 94 surrounding the blister openings 93. A corresponding hole 108 is drilled in the tray 106 so that a probe 111 carrying thermistor 15 may be inserted from below and be in close proximity to the heater element.

The completed heater circuit is attached to the surface of the tray 106 by flush machine screws (not shown) or be cementing in place with a temperature resistant adhesive such as Dow Corning Silastic RTV 732. After attachment to the tray, the holes 98 for the card located retractable pins 97 are drilled and the pins 97 inserted.

Similar aligned holes 112 are drilled through the tray 106 and the substrate 92 for connecting wires 110 of the temperature control circuit 109 and the wires inserted from below and soldered to the circuit at connections 113 in an area outside that which is contacted by the platen of the pressure head in the heat sealing machine.

Alternately, trays intended for use with heat sealing machines that contain portions of the temperature control circuit as described above in connection with FIG. 1, provide for connecting the thermistor probe and the power set resistor to the temperature control portions in the machine. This is accomplished by connecting these components to a predetermined area at the tray periphery to contact a multi-connection probe mounted to the platen of the machine.

For etched heaters, it is advantageous that a temperature control circuit be used because the cement which holds the metal heater foil 91 to substrate 92 will be decomposed at temperatures above approximately 450° F., permanently damaging the heater circuit. The non-stick coating material will also decompose at this temperature. Moreover, contact of the power probes is made directly on the circuit (at 114 and 116) and arcing cannot be tolerated since the metal foil is thin. In addition, overheating of the blister material which causes a poor seal, is precluded by the temperature control circuit.

It is known that present trays without temperature control which employ a teflon sheet over the heater element have overheated to a temperature sufficient to damage the teflon, which decomposes above 600° F. It can be concluded therefore, that damaging temperatures will occur if no control is employed.

In addition to its ease of manufacture and to its elimination of all welded or soldered connections to the heater elements, the etched heater affords great versatility in producing heater shapes of any kind with almost equal ease.

Although my invention has been shown and described with reference to particular embodiments it should be understood that departures may be made therefrom within the scope of my invention as set forth in the following claims.

What is claimed is:

1. A heat sealing tray having at least one heater element attached thereto, means for positioning a like number of preformed containers thereon, each of said preformed containers being associated with a separate one of said heater elements, conductive means for connecting said heater elements to AC power terminals, current control means connected in the circuit path of said heater elements and adapted for use in full wave configuration with partial cycle conduction, a control circuit adapted to be connected between said power terminals and to said current control means and including impulse forming means for affecting a predetermined partial cycle conduction of said current control means and means for impeding the flow of current from said power terminals to said impulse forming means and temperature sensing means located in proximity to at least one of said heater elements and adapted to pass a signal to said control circuit when the temperature of said heater element rises to a predetermined level to impede the flow of current to said impulse forming means.

2. A tray according to claim 1 in which said impulse forming means includes resistance means selected to provide a predetermined partial cycle conduction of said current control means which resistance is selectively decreased as the total linear length of heater element is increased to provide a constant heating value of current.

3. A heat sealing tray for thermal impulse heat sealing lids to preformed plastic surfaced containers, comprising a rigid backing member having means for positioning at least one preformed container, a pair of contacts secured to said rigid backing member for receiving electrical energy and heater material secured over said rigid backing member and etched through to provide heat sealing elements substantially surrounding said container positioning means and the leads for conducting electrical energy to the heat sealing elements, said elements and conducting leads being integrally formed as an interconnected unit without needing additional joining means, in a continuous electrical path between said pair of contacts, all portions of said heat sealing elements and all portions of said conducting leads lying entirely in the same plane over said backing member and having a constant thickness and uniform composition of material from one end of said continuous electrical path to the other.

4. A heat sealing tray according to claim 3 wherein all portions of said pair of contacts lie entirely in said same plane and have a constant thickness and uniform composition of material to said heat sealing element.

5. A heat sealing tray according to claim 3 wherein said sheet is bonded to an insulating substrate positioned upon said backing member.

6. A heat sealing tray according to claim 3 wherein said heater material has a non-stick coating.

7. A heat sealing tray according to claim 3 wherein said preformed container is positioned by aligned openings in said heater material and said backing member, said sheet being etched through to provide a continuous heater element circuit around said opening in said sheet.

8. A heat sealing tray according to claim 3 wherein means are connected to said heater material for controlling the flow of current in said heat sealing path to limit the temperature thereof.

* * * * *